United States Patent
Spurgat (12)

(10) Patent No.: US 6,773,037 B2
(45) Date of Patent: Aug. 10, 2004

(54) BRACKET FOR ATTACHING A CLAMP TO A HOSE

(75) Inventor: Jimmy C. Spurgat, Rawson, OH (US)

(73) Assignee: Cooper Technology Services, LLC, Findlay, OH (US)

( * ) Notice: Subject to any disclaimer, the term of this patent is extended or adjusted under 35 U.S.C. 154(b) by 94 days.

(21) Appl. No.: 09/989,514

(22) Filed: Nov. 20, 2001

(65) Prior Publication Data

US 2002/0060453 A1 May 23, 2002

Related U.S. Application Data

(60) Provisional application No. 60/252,713, filed on Nov. 22, 2000.

(51) Int. Cl.$^7$ ............................. F16L 55/00; F16L 33/00
(52) U.S. Cl. ........................... 285/23; 24/279; 285/253; 285/252; 285/367; 138/109
(58) Field of Search ..................... 285/23, 279, 139.1, 285/236, 242, 252, 253, 337, 407, 410, 420, 364, 365, 366, 367; 138/109; 24/279

(56) References Cited

U.S. PATENT DOCUMENTS

| | | |
|---|---|---|
| 1,736,630 A | 11/1929 | Scharpenberg |
| 1,776,850 A | 9/1930 | Cheswright |
| 2,208,706 A | 7/1940 | Spencer |
| 2,550,186 A | 4/1951 | Clamp |
| 3,043,612 A | 7/1962 | Pavlik et al. |
| 3,365,218 A | 1/1968 | Denyes |
| 3,407,449 A | 10/1968 | Tetzlaff et al. |
| 3,729,027 A | 4/1973 | Bare |
| 4,244,088 A * | 1/1981 | Sauer ........................ 24/274 R |
| 4,528,730 A * | 7/1985 | Spaulding ................. 24/274 R |
| 4,736,695 A | 4/1988 | Junemann |
| 4,763,695 A | 8/1988 | Dooley |
| 4,776,613 A | 10/1988 | Dickey et al. |
| 4,887,334 A * | 12/1989 | Jansen et al. ................ 24/23 R |
| 4,956,898 A * | 9/1990 | Miyamura et al. ........ 24/274 R |
| 5,002,094 A | 3/1991 | Brovont |
| 5,145,218 A | 9/1992 | Worley et al. |
| 5,234,233 A | 8/1993 | Fix |
| 5,247,967 A | 9/1993 | Bourque |
| 5,297,821 A | 3/1994 | Campo |
| 5,315,737 A * | 5/1994 | Ouimet ..................... 24/274 R |
| 5,388,321 A | 2/1995 | Farrell |
| 5,388,617 A | 2/1995 | Sasaki et al. |
| 5,456,784 A | 10/1995 | Cogdill et al. |
| 5,497,808 A | 3/1996 | Schlund et al. |
| 5,499,430 A | 3/1996 | Strazar |
| 5,504,978 A * | 4/1996 | Meyer, III ................. 24/274 R |
| RE35,253 E | 5/1996 | Worley et al. |
| 5,616,205 A | 4/1997 | Cogdill et al. |
| 5,620,209 A | 4/1997 | Sauer |
| 5,622,391 A | 4/1997 | Belik |
| 5,682,651 A | 11/1997 | Sauer |
| 5,706,862 A | 1/1998 | Meinerding |
| 5,915,739 A | 6/1999 | Cradduck et al. |
| 5,956,817 A * | 9/1999 | Chen ........................ 24/274 R |

\* cited by examiner

*Primary Examiner*—Lynne H. Browne
*Assistant Examiner*—Aaron Dunwoody
(74) *Attorney, Agent, or Firm*—Carlson, Gaskey & Olds

(57) ABSTRACT

A plastic bracket (10) including a screw housing cover (26) and a pair of opposing tabs (28) is pressed over a screw housing (12) of a worm drive clamp (14) to secure the worm drive clamp (14) to a hose (24). The tabs (28) can extend either be inside or outside of the screw housing cover (26). A protrusion (46) located on each of the opposing inner surfaces (48) of the screw housing cover (26) retain the bracket (10) over the screw housing (12). End caps (40) and (44) molded across opposing sides of the screw housing cover (26) maintain the position of the screw housing (12) in the screw housing cover (26) during assembly and prevent the sliding of the worm drive clamp (14).

26 Claims, 3 Drawing Sheets

BRACKET FOR ATTACHING A CLAMP TO A HOSE

This application claims priority to U.S. Provisional Application serial No. 60/252,713 filed Nov. 22, 2000.

BACKGROUND OF THE INVENTION

The present invention relates generally to a bracket pressed over the screw housing of the worm drive clamp for attaching a worm drive clamp to a hose.

A worm drive clamp is attached to a hose to facilitate the installation of the hose on a vehicle. The clamps are made of stainless steel to provide for maximum corrosion protection. However, as quick setting glues do not bond well to stainless steel, glues are not a desirable method of attachment.

Worm drive clamps can be attached to the hose by a metal clip spot-welded to the band of the clamp. The clip is attached to the end of the hose and clinched into the interior wall. However, as the clip may damage the interior wall, this method of attachment is also undesirable.

An elastomeric patch or a woven patch of synthetic fabric have also been used as a method of attachment. The elastomeric patch is positioned over the band and vulcanized to the outer surface of the hose. A drawback to the elastomeric patch is that it is time consuming to prepare the surface of the hose and to vulcanize the elastomeric patch. The woven patch is glued over the clamp band, but is difficult to handle, making installation slow. Additionally, both types of patches are unattractive as they protrude over the exterior of the band.

In all of the above-mentioned methods of attachments, the worm drive clamp is attached to the hose at the band. A drawback associated with attaching the worm drive clamp at the band is that the worm drive clamp can twist around the outer surface of the hose as the screw is tightened, causing the screw to travel. If the screw travels into a tight space, problems can result in reaching the screw.

SUMMARY OF THE INVENTION

A bracket pressed over the screw housing of a worm drive clamp secures the worm drive clamp to a hose. The bracket is preferably made of plastic and includes a screw housing cover having a large portion and a small portion and a pair of opposing tabs. The tabs extend outside of the screw housing and have an appropriate curvature which approximately equals the curvature of the outer surface of the hose. A protrusion on each of the opposing interior surfaces of the screw housing cover secures the bracket onto the screw housing. The screw housing cover further includes a first end cap located on the front side of the large portion and a second end cap located on the opposing rear side of the small portion to maintain the position of the screw housing cover over the screw housing during assembly. Alternatively, the tabs extend inside the screw housing cover.

During assembly, the bracket is pressed onto the screw housing. After the hose is inserted into the gluing machine, glue is applied on the hose at the location where the tabs will be positioned. A gluing machine clamp block orients the worm drive clamp and brings the bracket into contact with the hose, providing pressure until the glue hardens.

The hose is then removed from the gluing machine with the bracket attached. The worm drive clamp is then tightened around the outer surface of the hose by turning the screw.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
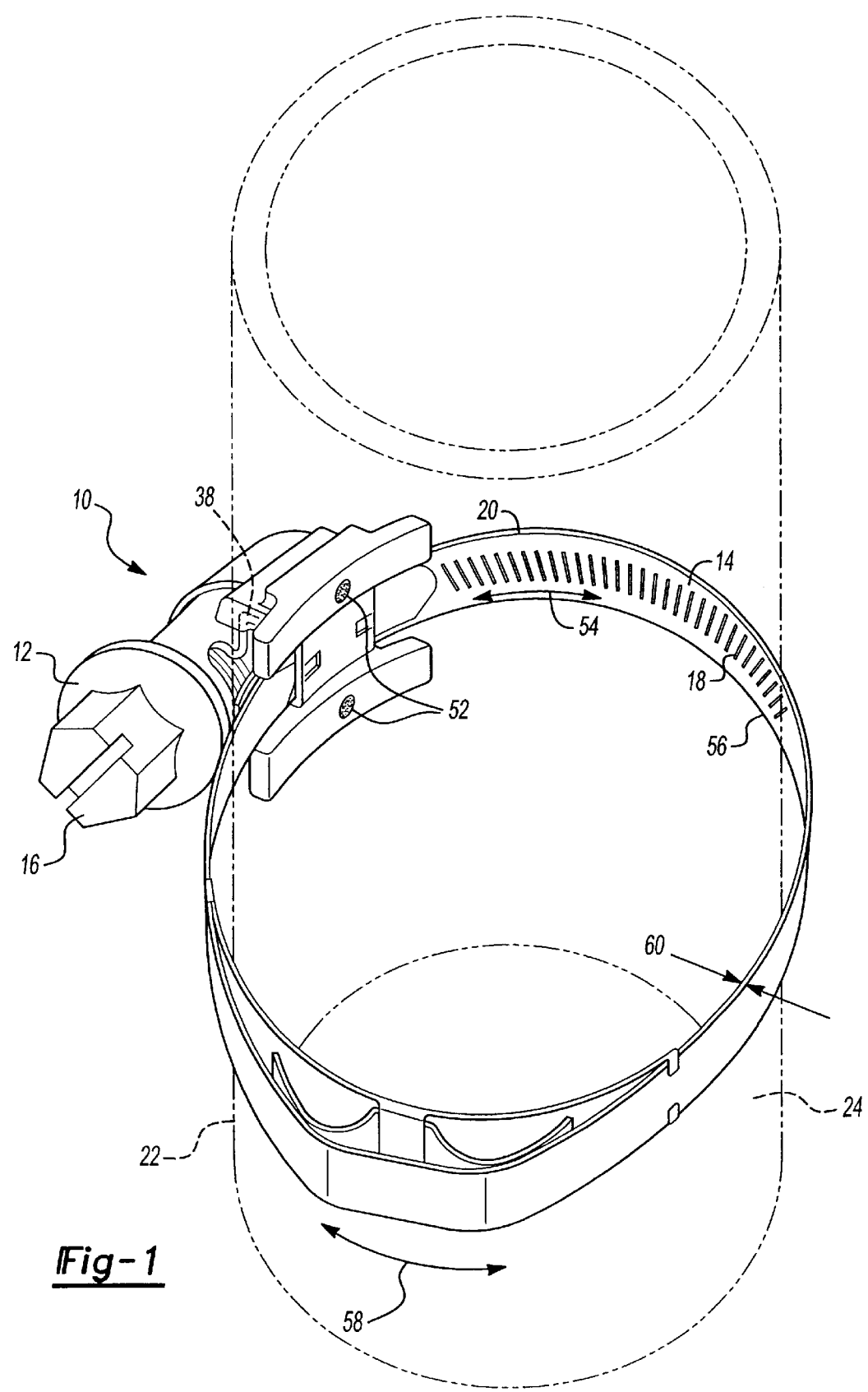
FIG. 1 illustrates perspective view of the molded bracket of the present invention pressed over a screw housing of a worm drive clamp.

FIG. 1 illustrates the bracket 10 of the present invention pressed over a screw housing 12 of a worm drive clamp 14. As a screw 16 is turned by a screw driver, the threads of the screw 16 engage threads 18 embossed on the band 20 of the worm drive clamp 14, tightening the worm drive clamp 14 around the outer surface 22 of a hose 24.

Figure 2:
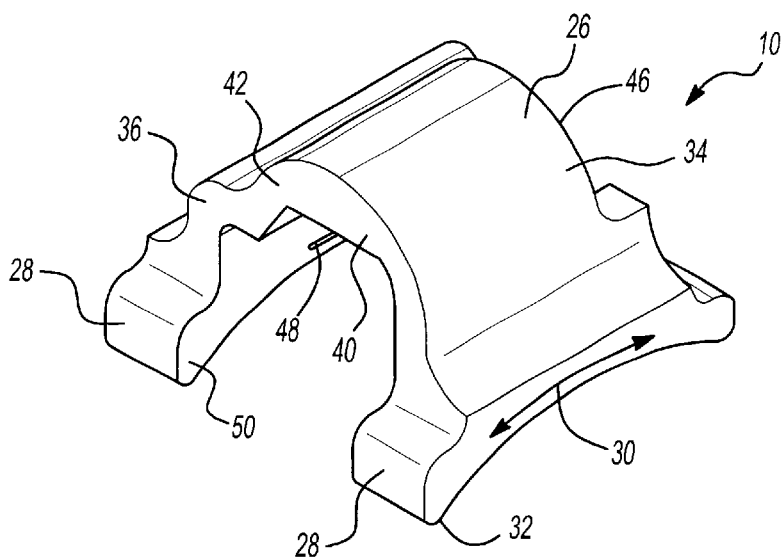
FIG. 2 illustrates a perspective view of the molded bracket.

As illustrated in FIG. 2, the bracket 10 includes a substantially U-shaped screw housing cover 26 and a pair of opposing outwardly extending tabs 28. Preferably, the bracket 10 is made of plastic and is injection molded. However, the bracket 10 can also be made of metal or a thermal plastic elastomer. The tabs 28 have a width W and a length L and are an integral part of the screw housing cover 26. The tabs 28 each have a curvature 30 which approximately equals the curvature 58 of the outer surface 22 of the hose 24 (shown in FIG. 1). The length L of the tabs 28 can provide a visual gage such that when the end 32 of a tab 28 is aligned with the end of the hose 24, the bracket 10 is positioned at the proper location.

Figure 3:
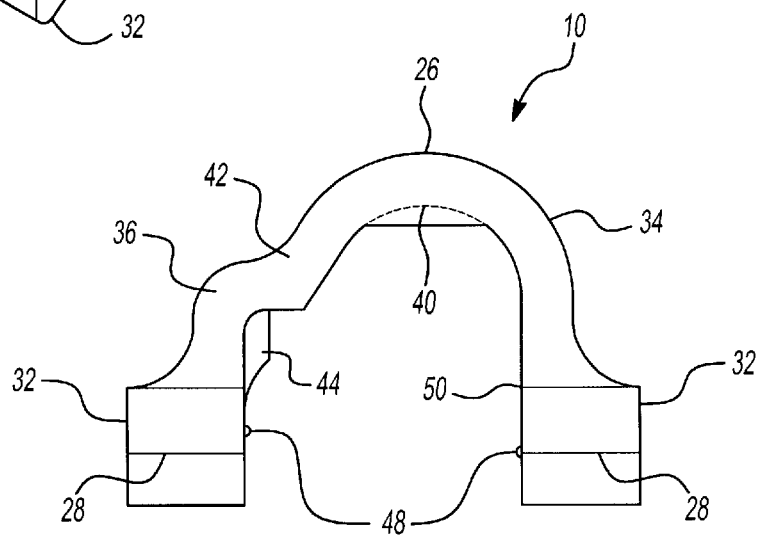
FIG. 3 illustrates a front view of the molded bracket.
Figure 4:
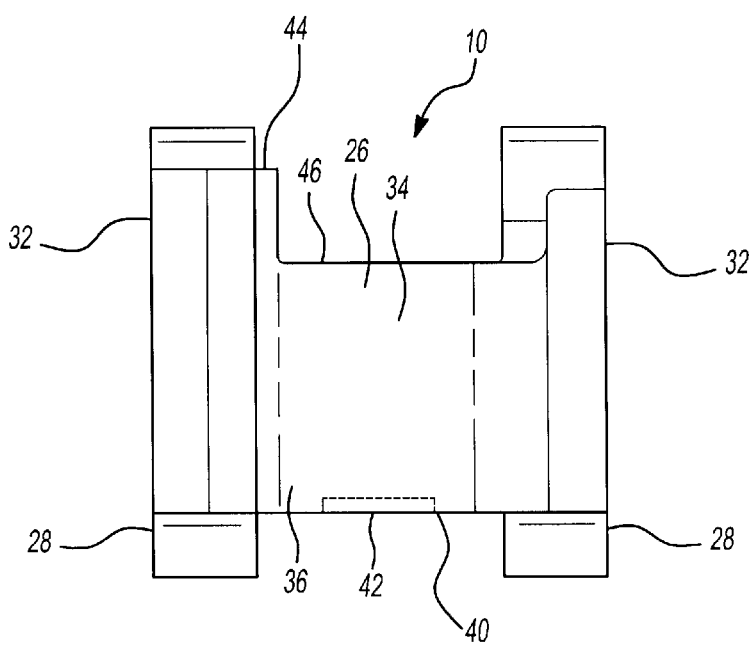
FIG. 4 illustrates a top view of the molded bracket.

As illustrated in FIGS. 3 and 4, the screw housing cover 26 includes a large portion 34 which receives the screw housing 12 and an adjacent small portion 36 which covers the screw housing offset 38 (shown in FIG. 1). A first end cap 40 on the front side 42 of the large portion 34 and a second end cap 44 on the opposing rear side 46 of the small portion 36 prevent the sliding of the screw housing 12 within the bracket 10 during assembly of the bracket 10 onto the hose 24.

The bracket 10 further includes a pair of protrusions 48 on the opposing interior surfaces 50 of the screw housing cover 26. After the bracket 10 is pressed over the screw housing 12, the protrusions 48 retain the bracket 10 over the screw housing 12. Preferably, each protrusion 48 is approximately 3/16 of an inch long and approximately 0.010 of an inch in height.

When assembling the worm drive clamp 14 to the hose 24, the bracket 10 is pressed onto the screw housing 12, the protrusions 48 retaining the bracket 10 over the screw housing 12. The worm drive clamp 14 is placed into a clamp gluing machine clamp block. After inserting the hose 24 into a gluing machine, a drop of glue 52 is applied on the outer surface 22 of the hose 24 at the locations where the tabs 28 will be positioned. Preferably, the glue is cyanoacrylate glue. However, it is to be understood that other types of glue can be employed. The clamp block orients the worm drive clamp 14 over the hose 24 and brings the bracket 10 into contact with the hose 24, providing pressure until the glue 52 hardens. After the clamp block is removed, the hose 24 is removed from the gluing machine with the bracket 10 attached. The band 20 is tightened around the outer surface 22 of the hose 24 by turning the screw 16 with a screw driver. The end caps 40 and 44 prevent sliding of the screw housing 12 as the worm drive clamp 14 is tightened, insuring later alignment of the screw driver within the screw 16.

Figure 5:
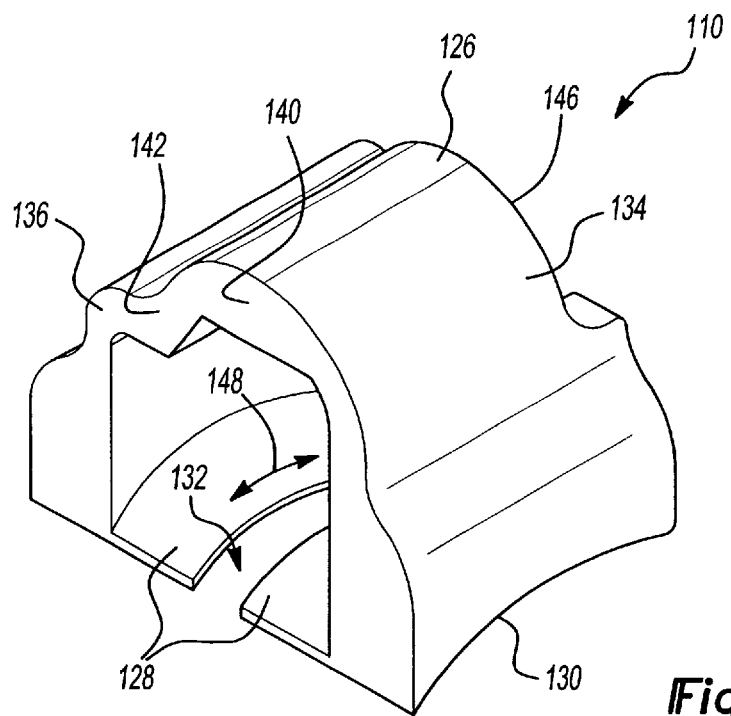
FIG. 5 illustrates a perspective view of an alternative embodiment of the molded bracket.
Figure 6:
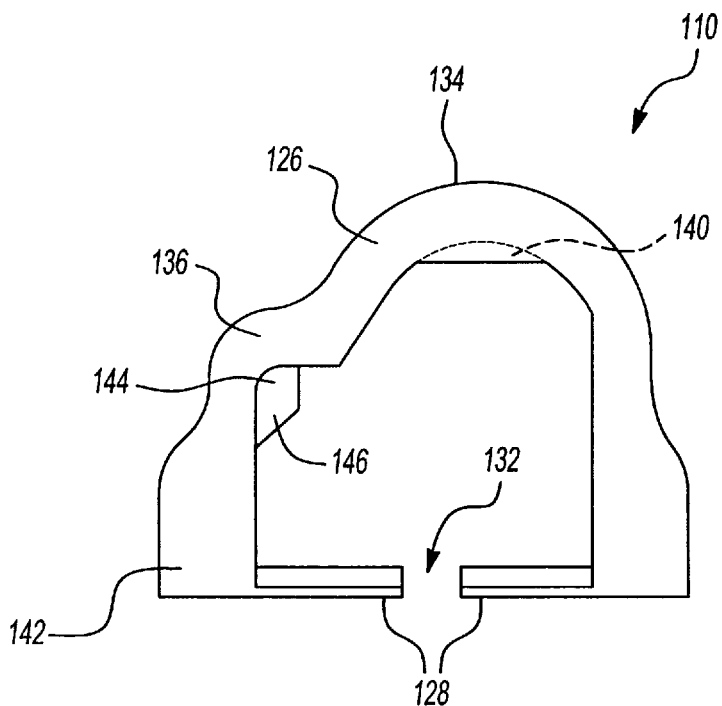
FIG. 6 illustrates a front view of the alternative embodiment of the molded bracket.

FIGS. 5 and 6 illustrate an alternative embodiment of the bracket 110 of the present invention. The bracket 110 includes a screw housing cover 126 and a pair of opposing inwardly extending tabs 128 having a curvature 130 which approximately equals the curvature 58 of the outer surface 22 of the hose 24 (shown in FIG. 1). The tabs 128 preferably are approximately 0.015 of an inch thick. The tabs 128 are separated by a gap 132 having a curvature 148 which approximately equals the curvature 54 of the band 20. Preferably, the gap 132 is approximately 0.125 of an inch wide.

The screw housing cover 126 further includes a large portion 134 which receives the screw housing 12 and an adjacent small portion 136 which receives the screw housing cover offset 38. A first end cap 140 on the front side 142 of the large portion 134 and a second end cap 144 on the opposing rear side 146 on the small portion 136 prevent the sliding of the screw housing 12 within the bracket 110.

When assembling the bracket 110 on the worm drive clamp 14, the thickness 60 of the band 20 is inserted through the gap 132 of the bracket 110 having the curvature 148. The bracket 110 is then rotated approximately 90° such that the inner surface 56 of the band 20 overlays the inward tabs 128. The bracket 110 is then slid over the screw housing 12. The bracket 110 slightly flexes and opens as the bracket 110 is slid over the screw housing 12 to prevent the end caps 140 and 144 from interfering with the sliding. The worm drive clamp 14 is then attached to the tube 24 in the same manner as the bracket 10.

An advantage of the bracket 110 is that that as the tabs 128 extend inwardly, the tabs 128 can be made larger without affecting the size of the bracket 110. Additionally, it is easier to apply the glue 52 as there is a greater surface area for attachment. Finally, as the tabs 128 are located on the inside of the screw housing cover 126, the bracket 110 can be positioned closer to the end of the tube 24 as the bracket 110 can be made narrower.

The bracket 10 can also be pressed over the band 20 of the worm drive clamp 14 rather than over the screw housing 12. The bracket 10 can be over-molded around the worm drive clamp 14 or formed from strip metal. Preferably, the hose 24 is a low-permeation hose. However, other types of hoses can be employed. The bracket 10 can also be utilized with other types of clamps, such as spring steel constant tension clamps, wire band clamps, and pipe boot clamps. The bracket 10 of the present invention is low in cost and has an attractive appearance.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A clamp assembly comprising:
   a clamp including a band having and a screw housing mounted to said band with a worm screw disposed in said screw housing, said worm screw engaging said band for tightening said band;
   a non-metallic attachment member having an opening receiving said screw housing and a bonding surface facing away from said opening; and
   an adhesive on said bonding surface capable of contacting an outer surface of a hose.

2. The clamp assembly as recited in claim 1 wherein said attachment member is plastic.

3. The clamp assembly as recited in claim 1 wherein said attachment member further includes at least one protrusion located on an interior surface of said opening to retain said attachment member on said screw housing.

4. The clamp assembly as recited in claim 3 wherein said interior surface prevents lateral movement of said screw housing in a direction perpendicular to an axis of said worm screw.

5. The clamp assembly as recited in claim 1 wherein said attachment member further includes a first lip on a first side of said attachment member and a second lip on an opposing second side of said attachment member to retain said screw housing in said opening in a direction parallel to an axis of said worm screw.

6. The clamp assembly as recited in claim 1 wherein said attachment member further includes a pair of opposing tabs each having a surface curvature defining said bonding surface.

7. The clamp assembly as recited in claim 6 wherein said pair of opposing tabs extend away from said opening.

8. The clamp assembly as recited in claim 6 wherein said pair of opposing tabs extend within said opening.

9. The clamp assembly as recited in claim 8 wherein said pair of opposing tabs are separated by a curved gap for allowing access to said opening.

10. The claim assembly as recited in claim 1 wherein said screw housing is removably received in said attachment member.

11. A hose and clamp assembly comprising:
    a hose having an outer surface and a hose curvature;
    a clamp including a band and screw housing mounted to said band with a worm screw disposed in said screw housing, said worm screw engaging said band for tightening said band;
    an attachment member having an opening receiving said screw housing and a bonding surface secured to an outer surface of said hose and having a surface curvature approximately equal to said hose curvature; and
    an adhesive applied on said bonding surface to secure said attachment member to said outer surface of said hose.

12. The hose and clamp assembly as recited in claim 11 wherein said attachment member is plastic.

13. The hose and clamp assembly as recited in claim 11 wherein said attachment member further includes at least one protrusion located on an interior surface of said opening to retain said attachment member on said screw housing.

14. The clamp assembly as recited in claim 13 wherein said interior surface prevents lateral movement of said screw housing in a direction perpendicular to an axis of said worm screw.

15. The hose and clamp assembly as recited in claim 11 wherein said attachment member further includes a first lip on a first side of said attachment member and a second lip on an opposing second side of said attachment member to retain said screw housing in said opening in a direction parallel to an axis of said worm screw.

16. The hose and clamp assembly as recited in claim 11 wherein said attachment member further includes a pair of opposing tabs each having a surface curvature defining said bonding surface.

17. The hose and clamp assembly as recited in claim 16 wherein said pair of opposing tabs extend away from said opening.

18. The hose and clamp assembly as recited in claim 16 wherein said pair of opposing tabs extend within said opening.

19. The hose and clamp assembly as recited in claim 18 wherein said pair of opposing tabs are separated by a curved gap for allowing access to said opening.

20. The hose and clamp assembly as recited in claim 11 wherein said bonding surface is secured to said hose by glue.

21. The hose and clamp assembly as recited in claim 11 wherein said attachment member is non-metallic.

22. The claim assembly as recited in claim 11 wherein said screw housing is removably received in said attachment member.

23. A method of securing a clamp to an outer surface of a hose comprising the steps of:

providing a clamp having a band and a screw housing mounted to said band with a worm drive screw disposed in said screw housing;

providing an attachment member having a cavity defining an opening;

securing said attachment member to said screw housing such that said screw housing is received in said cavity of said attachment member;

positioning said band around a hose; and adhering a bonding surface of said attachment mechanism to an outer surface of said hose.

24. The method as recited in claim 23 further comprising the step of tightening said band around said outer surface of said hose by turning said worm drive screw.

25. The method as recited in claim 23 wherein the step of securing said bonding surface to said outer surface of said hose includes applying glue to at least one of said hose and said attachment member.

26. The method as recited in claim 23 wherein said the step of securing the attachment member to said screw housing is before the step of positioning said band around said hose.

* * * * *

UNITED STATES PATENT AND TRADEMARK OFFICE
CERTIFICATE OF CORRECTION

PATENT NO. : 6,773,037 B2
DATED : August 10, 2004
INVENTOR(S) : Spurgat

It is certified that error appears in the above-identified patent and that said Letters Patent is hereby corrected as shown below:

Column 4,
Line 1, please insert -- applied -- after "adhesive" and before "on"
Line 35, please insert -- a -- after "and" and before "screw"

Signed and Sealed this

Twenty-eighth Day of September, 2004

JON W. DUDAS
*Director of the United States Patent and Trademark Office*